(12) United States Patent
Michel

(10) Patent No.: US 10,668,894 B2
(45) Date of Patent: Jun. 2, 2020

(54) SEAT BELT RETRACTOR

(71) Applicant: TRW AUTOMOTIVE GMBH, Alfdorf (DE)

(72) Inventor: Frederic Michel, Schwäbisch Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 292 days.

(21) Appl. No.: 15/564,227

(22) PCT Filed: Apr. 7, 2016

(86) PCT No.: PCT/EP2016/000566
§ 371 (c)(1),
(2) Date: Oct. 4, 2017

(87) PCT Pub. No.: WO2016/169637
PCT Pub. Date: Oct. 27, 2016

(65) Prior Publication Data
US 2018/0126948 A1      May 10, 2018

(30) Foreign Application Priority Data

Apr. 20, 2015    (DE) .......................... 10 2015 004 972

(51) Int. Cl.
*B60R 22/40*      (2006.01)
*B60R 22/46*      (2006.01)
(52) U.S. Cl.
CPC .......... *B60R 22/4671* (2013.01); *B60R 22/40* (2013.01)

(58) Field of Classification Search
CPC ............................ B60R 22/40; B60R 22/4671
See application file for complete search history.

(56) References Cited

U.S. PATENT DOCUMENTS

| 2004/0095010 | A1  | 5/2004 | Strobe |
| 2018/0236969 | A1* | 8/2018 | Michel .................. B60R 22/405 |
| 2019/0210556 | A1* | 7/2019 | Michel .................... B60R 22/40 |

FOREIGN PATENT DOCUMENTS

| DE | 19647842   | 5/1998 |
| DE | 20313663   | 4/2004 |
| DE | 102008037544 | 2/2008 |

* cited by examiner

*Primary Examiner* — Sang K Kim
(74) *Attorney, Agent, or Firm* — Tarolli, Sundheim, Covell & Tummino LLP

(57) ABSTRACT

In a belt retractor (10) comprising a frame (12), a sensor (16) for vehicle-sensitive blocking including a sensor lever (22), a belt reel (14) and a rocker arm (30) coupled to the belt reel (14) via a coupling (32) which is adjustable between a home position in which the sensor lever (22) is blocked and an extended position in which the sensor lever (22) is released, the coupling (32) is a wrap spring coupling comprising a drive element (34) coupled to the belt reel (14) as well as a driven element (40) connected to the rocker arm (30), wherein the drive element (34) and the driven element (40) include a respective annular outer friction surface (38, 44) and are arranged concentrically to each other and a coil spring (46) is provided which contacts the friction surfaces (38, 44) and couples the driven element (40) to the drive element (34).

10 Claims, 8 Drawing Sheets

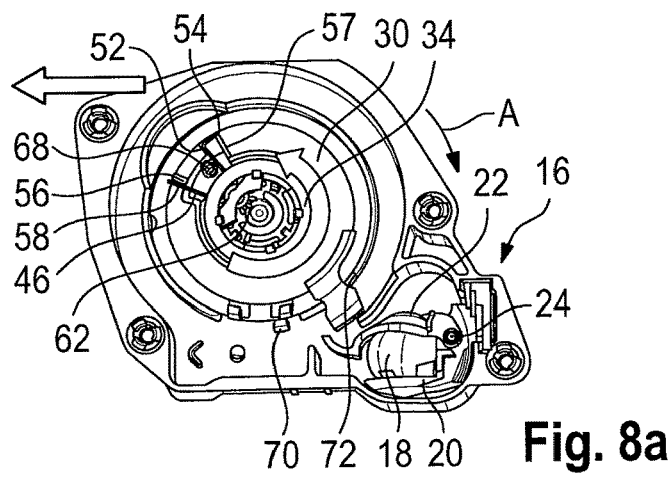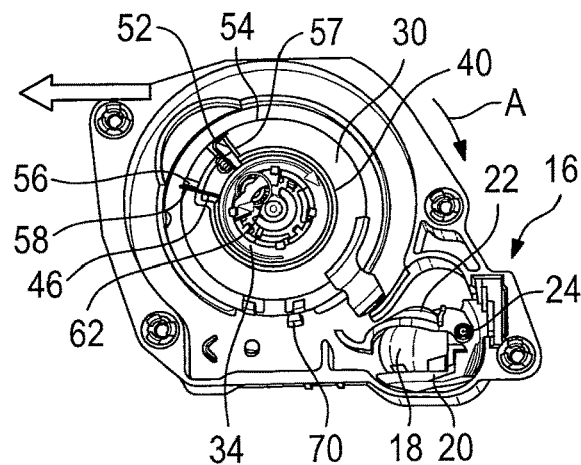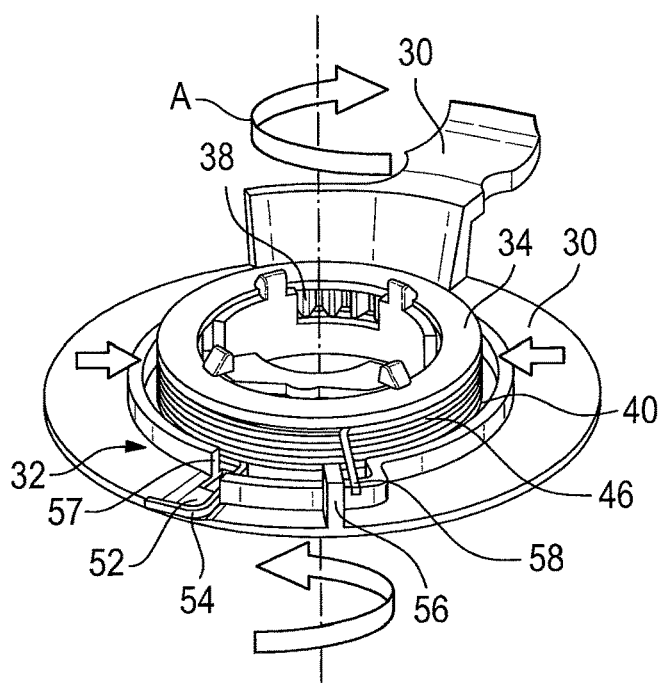
Fig. 8a
Fig. 8b
Fig. 8c

SEAT BELT RETRACTOR

RELATED APPLICATIONS

This application corresponds to PCT/EP2016/000566, filed Apr. 7, 2016, which claims the benefit of German Application No. 10 2015 004 972.0, filed Apr. 20, 2015, the subject matter, of which are incorporated herein by reference in their entirety.

BACKGROUND OF THIS INVENTION

The invention relates to a belt retractor comprising a frame, a sensor for vehicle-sensitive blocking which includes a sensor lever, a belt reel and a rocker arm coupled to the belt reel via a coupling which is adjustable between a home position in which the sensor lever is blocked and an extended position in which the sensor lever is released.

Belt retractors include a vehicle-sensitive blocking system usually provided with a sensor which generally has, as an inertia mass, a metal ball that is movably supported in a shell fixed to a housing. A sensor lever which is pivoted on a housing and is swiveled about a swivel bearing by the movement of the metal ball rests on the metal ball. When the sensor lever is swiveled in such way, the end thereof gets into the path of motion of control teeth at the periphery of a control disk arranged to be rotatable to a limited extent on the belt reel. In this way, the control disk is stopped so that relative rotation between the control disk and the belt reel will take place. Said relative rotation is exploited so as to move a blocking pawl pivoted on a frame of the belt retractor in blocking engagement with blocking teeth assigned to the belt reel.

In order to reduce the occurrence of disturbing notes by vibrations onto the vehicle during driving, for example on uneven roads, it is known from DE 10 2006 037 544 A1 to provide an additional rocker arm which is coupled to the belt reel via a friction coupling and blocks the sensor lever in the home position. The sensor lever is blocked by said rocker arm in almost all operating states of the belt retractor so that the sensor lever is reliably prevented from rattling. The sensor lever is released by the rocker arm only when the belt reel is or was rotated in the unwinding direction, i.e. in operating states such as strong deceleration during which the belt reel has to be blocked. In such belt retractors, the coupling is exposed to very high loads.

SUMMARY OF THE INVENTION

It is the object of the invention to provide a belt retractor of the type mentioned in the beginning which exhibits improved stability.

For achieving the object, a belt retractor is provided comprising a frame, a sensor for vehicle-sensitive blocking including a sensor lever, a belt reel and a rocker arm coupled to the belt reel via a coupling which is adjustable between a home position in which the sensor lever is blocked and an extended position in which the sensor lever is released. In accordance with the invention, the coupling is a wrap spring coupling comprising a drive element coupled to the belt reel as well as a driven element connected to the rocker arm, wherein the drive element and the driven element have an annular outer friction surface and are arranged concentrically to each other and a coil spring is provided which contacts the friction surfaces and couples the driven element to the drive element. A wrap spring coupling offers the advantage that it exhibits very high stability as, due to the constructional design, fewer individual parts are provided which are moreover configured so that they cannot break or be otherwise deformed. Such wrap spring coupling in addition permits better adaptation of the coupling to the loads occurring during vehicle operation. In particular, the coupling characteristics can be adjusted very accurately by means of the wrap spring coupling so that also the response behavior of the belt retractor can be adjusted very accurately.

The coil spring preferably contacts the friction surface of the driven element by a first portion and contacts the friction surface of the drive element by a second portion. The coil spring extends from the first to the second portion in a winding direction corresponding to the winding direction of the belt retractor. It is a special feature of the wrap spring coupling that the forces which may be transmitted from the drive element to the driven element are differently high depending on the direction of rotation. When the drive element is rotated against the winding direction, the spring is pulled slightly more closely against the drive element and the driven element due to the friction and/or additional stops fixing the coil spring to the drive element and/or to the driven element so that the frictional forces will increase and a greater force can be transmitted. When the drive element is rotated in the opposite direction, however, the spring loosens due to the friction of the drive element so that lower force can be transmitted and, in an extreme case, the coil spring may even slip at the drive element and/or at the driven element. The winding direction of the coil spring is chosen so that in the case of rapid webbing extension the spring is tightened and increased force is transmitted, i.e. slipping between the drive element and the driven element is excluded. In this way, the rocker arm may be actuated via the coupling and thus the sensor lever may be released.

A first end of the coil spring in the winding direction is preferably held at the rocker arm so that this end cannot move relative to the rocker arm.

Moreover, at the rocker arm a projection may be provided to which the second end of the coil spring is adjacent in the winding direction. The first and/or second end of the coil spring can preferably be pivoted about a defined angle. The stops determine the maximum pivot angle of the ends and thus the maximum degree about which the coil spring can be laid more loosely or more tightly around the drive element and the driven element. Thus, the minimum or maximum friction which may act between the driven element and the drive element is determined.

Further, a stop for the first end of the coil spring arranged ahead of the first end of the coil spring in the winding direction may be provided on the frame. When the belt reel and, consequently, the rocker arm is rotated in the winding direction, for example when winding the webbing onto the belt reel, the first end of the coil spring is moved against said stop and is pressed against the latter upon continued rotation in the winding direction. The windings of the coil spring at the driven element and/or at the drive element are loosened in this way so that the friction between the coil spring and the driven element and, resp., the drive element decreases. This reduced friction helps to move the drive element against the coil spring fixed by the stop so that further rotation of the belt reel for winding the webbing is possible without co-rotation of the rocker arm. Hence the coupling between the belt reel and the rocker arm is loosened or oven removed.

At the frame, moreover a stop for the second end of the coil spring may be provided which is arranged behind the second end of the coil spring in the winding direction. When the webbing is unwound at normal speed, for example when fastening the seat belt, the second end of the coil spring is moved against said stop, thus equally causing the spring to be widened and the friction between the coil spring and the drive element and, resp., the driven element being reduced. In this way, further webbing extension is possible without the rocker arm rotating along with the belt reel.

In order to prevent the rocker arm from co-rotating even in the case of reduced friction between the coil spring and the drive element and, resp., the driven element, preferably stops for the rocker arm are provided on the housing to limit the pivot angle of the rocker arm.

Preferably, the drive element forms an internal gear of a planetary gearing, the sun gear of the planetary gearing being connected to the belt reel and at least one planet gear being provided which is pivoted on the rocker arm. The planetary gearing effectuates additional coupling of the drive element and, resp., of the belt reel to the rocker arm. When rotating the belt reel, for example during winding or unwinding of webbing, the planet gear connected to the belt reel is driven. Via the planet gear the internal gear, viz. the drive element, is driven, thus causing also the rocker arm to be moved via the coupling. Depending on the direction of rotation of the belt reel, either the first end or the second end of the spring is moved against one of the stops fixed to the frame, thus removing the coupling between the drive element and the driven element by forcing the spring open. As soon as said coupling is removed, the drive element may be rotated without any further movement of the driven element, viz. of the rocker arm.

In order to design the rocker arm to be more resistant to mechanical loads, the rocker arm preferably has a disk-shaped body and at the housing a pot-shaped seat for the body is provided.

For reducing the number of component parts the driven element is preferably formed integrally with the rocker arm.

BRIEF DESCRIPTION OF THE DRAWINGS

Further advantages and features are evident from the following description in connection with the attached drawings, wherein:

FIGS. 8a to 8c are different representations of the belt retractor upon unwinding the webbing from the belt reel.

DESCRIPTION

Figures 1, 2:
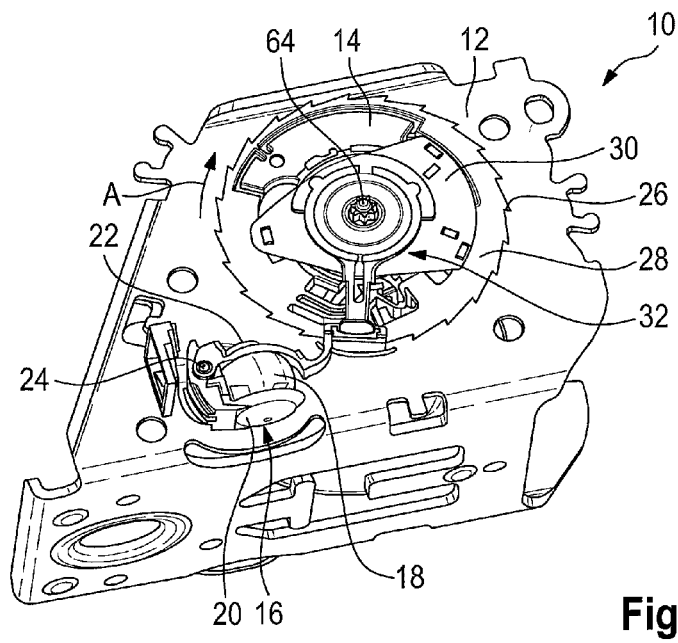
FIG. 1 shows a perspective view of a belt retractor according to prior art.
FIG. 2 shows a housing cover of the belt retractor of FIG. 1 in which a sensor for vehicle-sensitive blocking is supported.

FIG. 1 illustrates a belt retractor 10 according to prior art comprising a frame 12, a housing 13 here in the form of a housing cover, a belt reel 14 pivoted in the frame 12 and a sensor 16 which serves for vehicle-sensitive blocking of the belt reel 14.

The sensor 16 includes a metal ball 18 serving as inertia mass and being supported in a shell 20 fixed to the frame. Opposite to the shell 20 a sensor lever 22 is provided which is pivoted on the frame 12 via a bearing 24.

In the case of vibration of the belt retractor 10, the ball 18 is moved out of the shell 20 due to the large mass, which causes the sensor lever 22 to be swiveled about the bearing 24 so that the sensor lever engages in the teeth 26 of a control disk 28. In this way, the control disk 28 is stopped so that relative rotation between the control disk 28 and the belt reel 14 occurs when the belt reel is rotated in the unwinding direction. Said relative movement is used to activate a blocking mechanism that blocks the belt reel 14 fixed to the frame.

In order to prevent the sensor lever 22 from pivoting during regular vehicle operation and thus the blocking of the belt reel 14 from being released, a rocker arm 30 is provided which in a home position blocks the sensor lever 22 and in an extended position releases the sensor lever 22 so that vehicle-sensitive blocking of the belt reel 14 may take place. The rocker arm 30 is coupled to the belt reel 14 via a coupling.

Figure 3A:
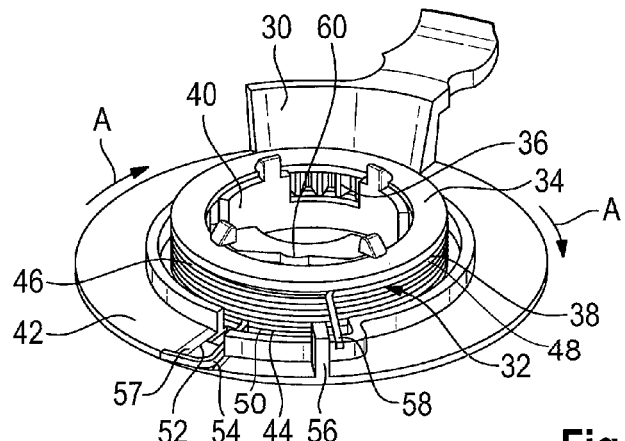
FIGS. 3a to 3c show various views of the rocker arm of a belt retractor according to the invention as well as of the coupling of the sensor.
Figure 3B:
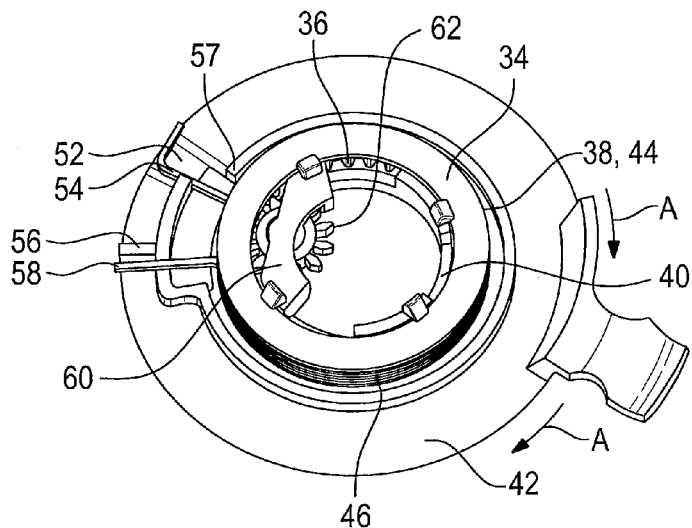
Figure 3C:
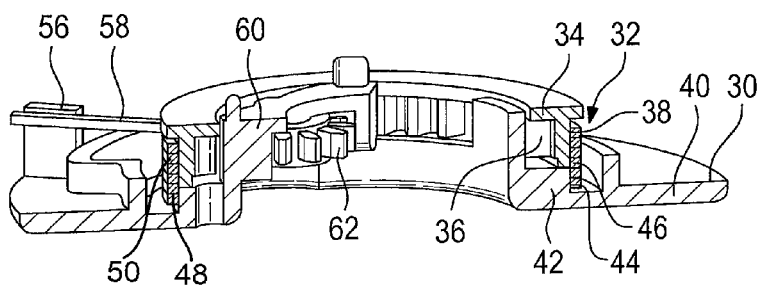
Figure 4A:
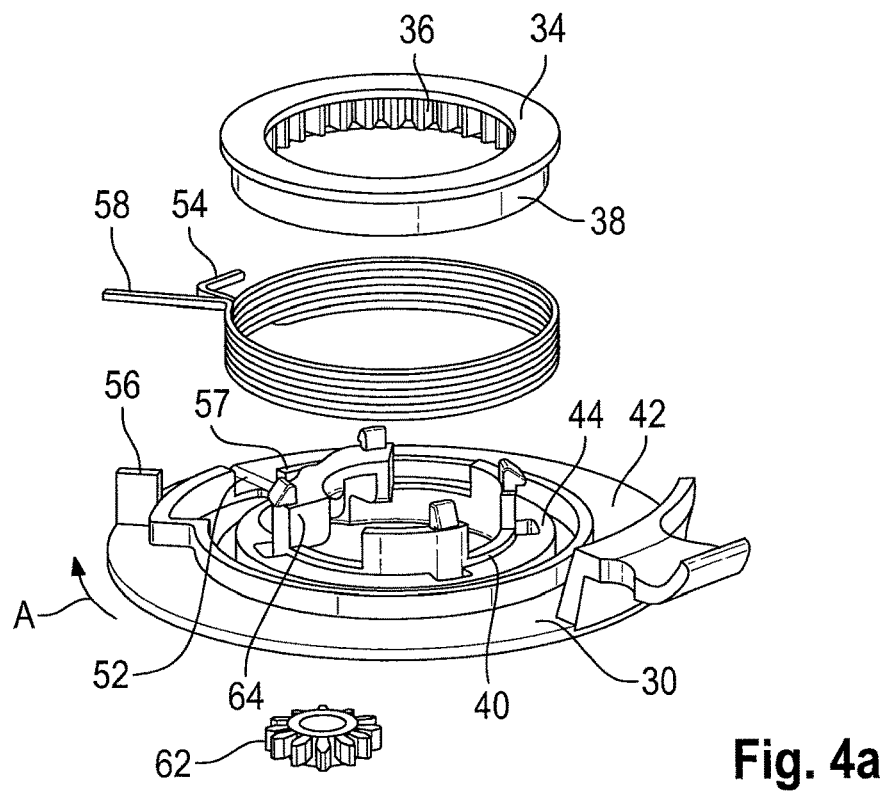
FIGS. 4a and 4b show exploded views of the rocker arm and of the coupling of FIGS. 3a to 3c, FIGS. 5a to 5c show different sectional views of the support of the sensor and, resp., of the coupling on a belt retractor according to the invention.
Figure 4B:
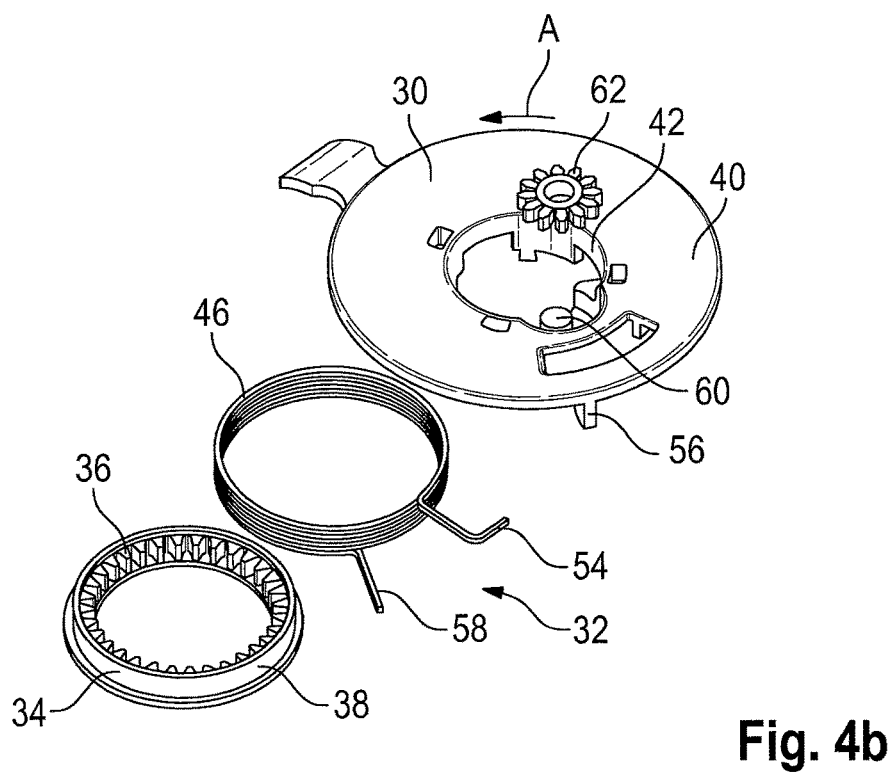

The coupling 32 shown in FIGS. 3a to 3c of the retractor according to the invention includes an annular drive element 34 having teeth 36 on the inside. On the outside the drive element 34 has a friction surface 38.

Moreover, the coupling includes a driven element 40 which is formed integrally with the rocker arm 30, especially with a disk-shaped body 42 of the rocker arm 30. The driven element 40 equally includes an annular friction surface 44 having the same diameter as the friction surface 38 of the drive element 34.

It is evident from FIG. 3c that the drive element 34 is pivoted on the driven element 40 and, resp., on the rocker arm 30. The drive element 34 and the driven element 40 are rotatable about a joint axis, with the friction surfaces 38, 44 being arranged concentrically to each other.

The drive element 34 is coupled to the driven element 40 via a coil spring 46. The drive element 34, the driven element 40 and the coil spring 46 jointly form a wrap spring coupling the structure and functioning of which shall be explained as follows.

A first portion 48 of the coil spring 46 contacts the friction surface of the driven element 40. A second portion 50 of the coil spring 46 contacts the friction surface 38 of the drive element 34. The winding direction from the first portion 48 to the second portion 50 in the mounted state of the coupling 32 corresponds to the retracting direction A (cf. FIG. 1) of the belt retractor 10.

A seat 52 for a first end 54 of the coil spring is provided on the rocker arm 30. Further, there is provided a projection 56 which is located in the winding direction, i.e. in the retracting direction ahead of the second end 58 of the coil spring 46 and is adjacent to the second end 58 as well as a stop 57 which is located at a distance in the winding direction A behind the first end 54.

The coil spring 46 is adjacent to the two friction surfaces 38, 44 in a biased state so that the drive element 34 is coupled to the driven element 40 by the friction between the friction surfaces 38, 44 and the coil spring 46. The frictional resistance between the friction surfaces 38, 44 and the coil spring 46 depends on the force by which the coil spring 46 is pressed against the friction surfaces 38, 44. When the coil spring 46 is pulled more tightly around the friction surfaces 38, 44, the friction increases, the windings of the coil spring 46 are loosened, the friction is reduced.

The seat 52 as well as the projection 56 prevent the coil spring from further tightening so that the maximally acting friction is determined. Loosening of the coil spring 46 against the winding direction, for example by removing the second end 58 from the stop 57, is possible, on the other hand, until the second end 58 is adjacent to the projection 56.

As is visible in FIGS. 3a to 3c as well as 4a and 4b, a bearing 60 for a gearwheel 62 is provided at the rocker arm. The gearwheel 62 is pivoted on the rocker arm 30 in said bearing 60. As is visible in FIG. 3b, the gearwheel 62 engages in the teeth 36 of the drive element 34. Furthermore, the gearwheel 62 engages in a gearwheel 64 mounted on the belt reel shaft. The gearwheel 64 forms the sun gear of a planetary gearing, the drive element 34 forms the internal gear and the gearwheel 62 forms a planet gear of the planetary gearing.

Figure 5A:
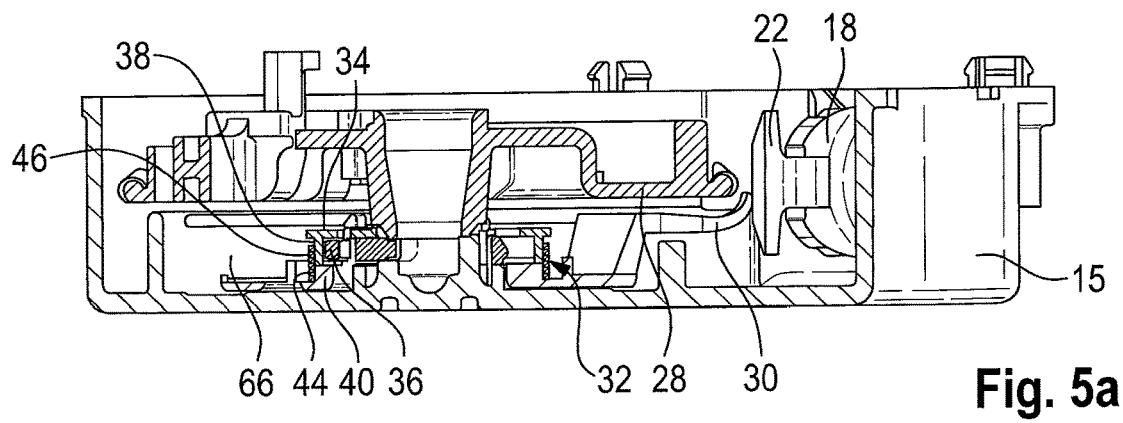
Figure 5B:
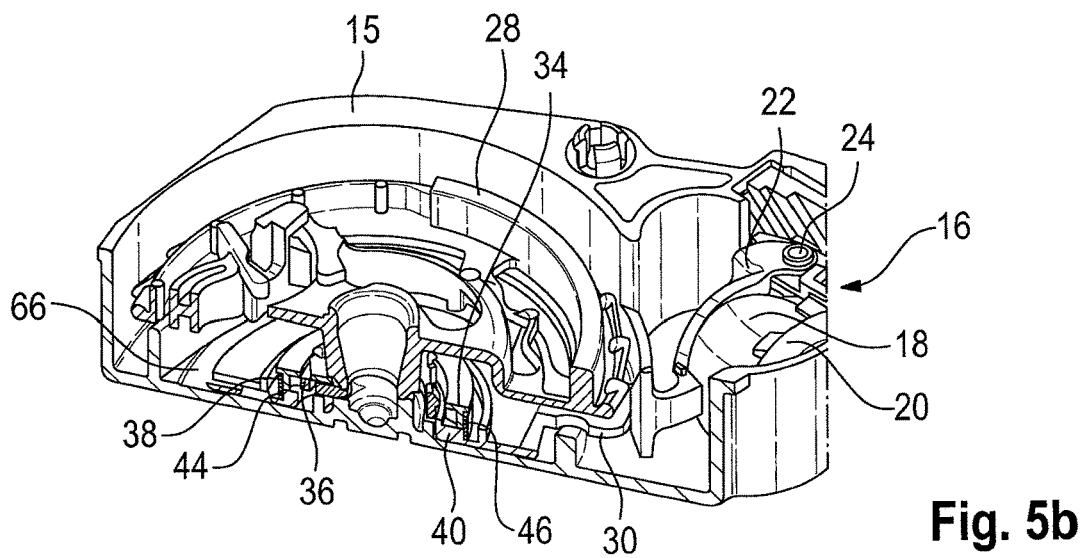
Figure 5C:
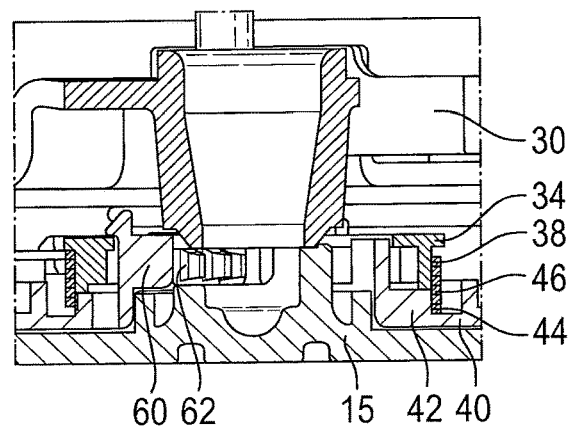
Figure 6A:
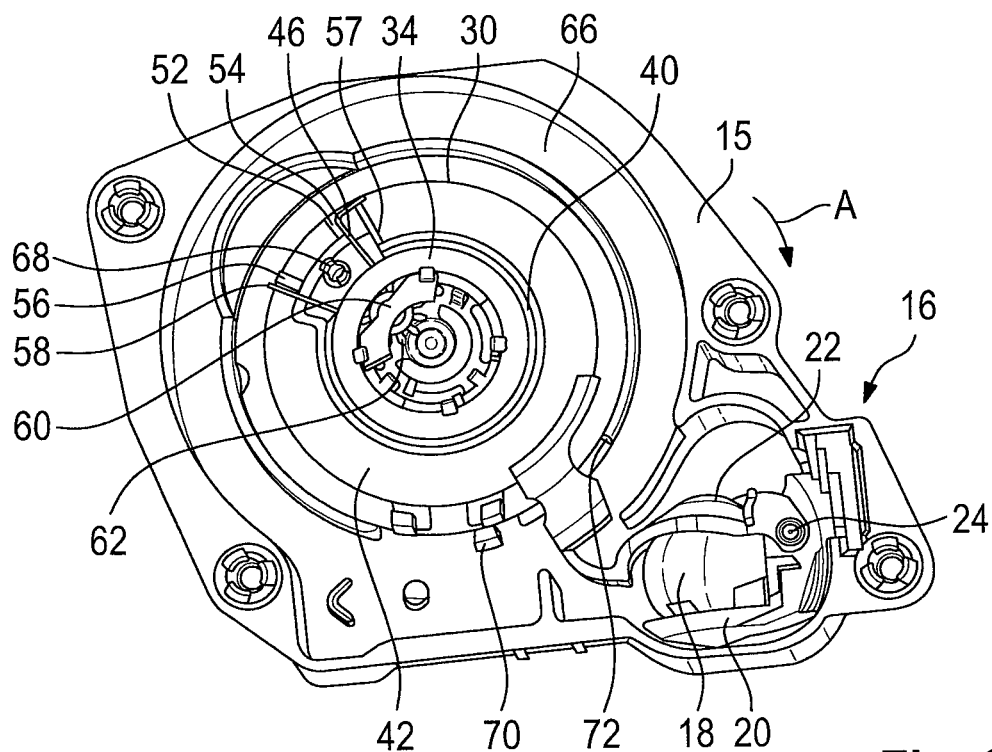
FIGS. 6a and 6b show different views of the support of the coupling as well as of the rocker arm and of the sensor in the housing cover of a belt retractor according to the invention.
Figure 6B:
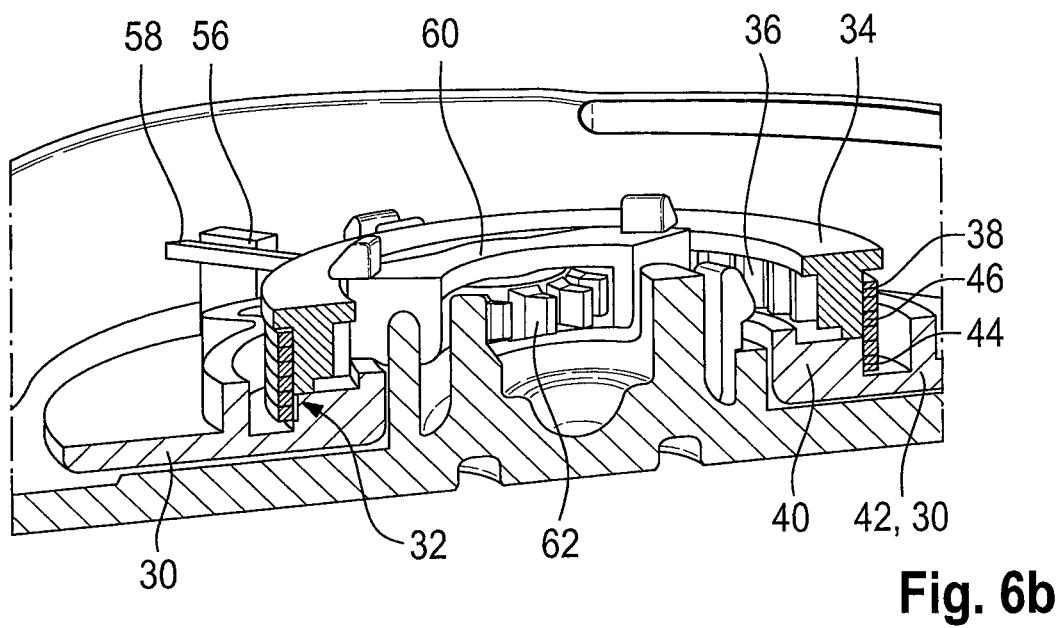

As is visible in FIGS. 5a to 5c as well as 6a and 6b, the rocker arm 30 is supported with the coupling 32 in a pot-shaped seat 66 on the housing cover. Further, a bolt-shaped projection is provided on the housing cover. As is evident from FIG. 6a, the stop 68 formed by the projection is located ahead of the first end 54 of the coil spring in the winding direction as well as behind the second end 58 of the coil spring 46 in the winding direction.

The functioning of the belt retractor 10 according to the invention shall be explained hereinafter by way of the FIGS. 7a to 7c as well as 8a to 8c.

Figure 7A:
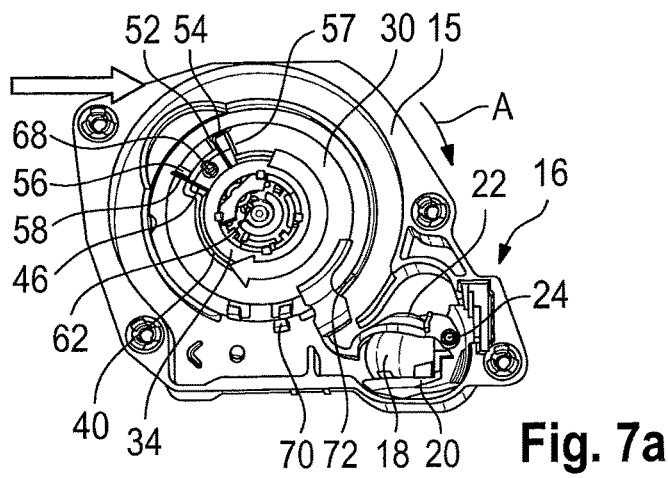
FIGS. 7a to 7c are representations of the belt retractor upon winding webbing onto the belt retractor.
Figure 7B:
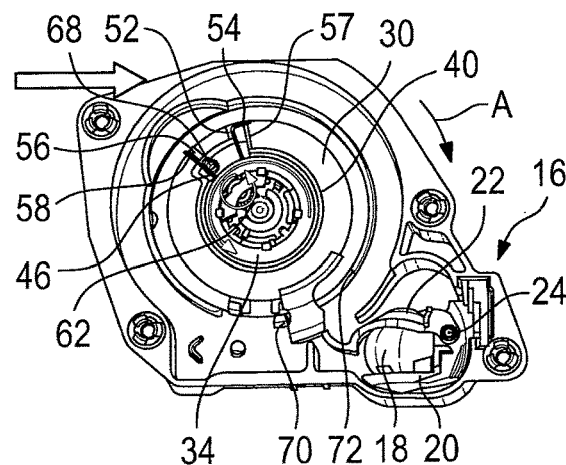
Figure 7C:
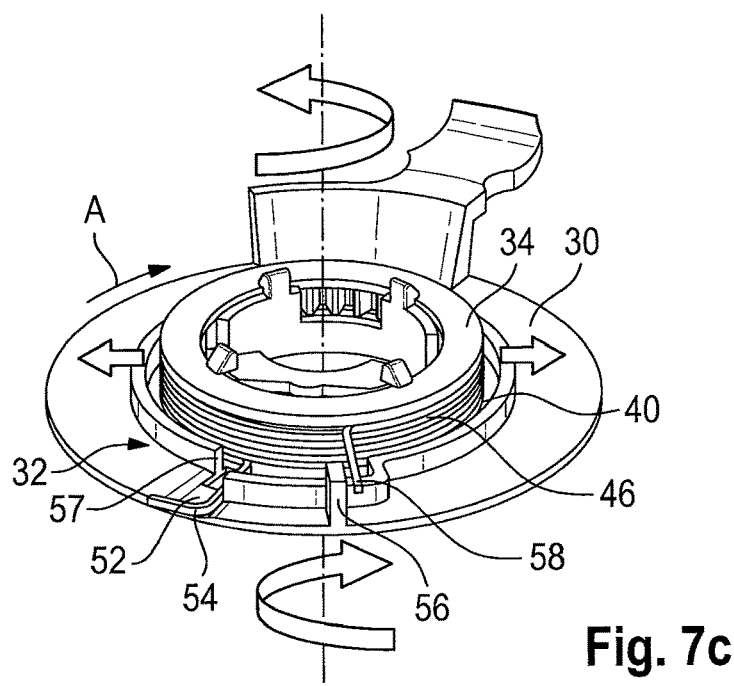

In FIGS. 7a to 7c the winding operation of webbing on the belt reel 14 is shown. The belt reel 14 is rotated in the winding direction A, thus causing the rocker arm 30 coupled to the belt reel 14 via the coupling 32 to be equally rotated in the winding direction A (FIG. 7a). The rocker arm 30 contacts the sensor lever 22 and hence is in the home position.

As the rocker arm 30 is coupled to the drive element 34 via the coupling 32, movement of the gearwheel 62 relative to the drive element 34 is not possible so that the entire unit of the rocker arm 30 and the coupling 32 is swiveled jointly with the belt reel 14 in the retracting direction A.

During said rotation, the second end 58 of the coil spring 46 enters into contact with the stop 68. Although, during further rotation of the belt reel 14 in the retracting direction A, the first end 54 of the coil spring 46 is moved in the winding direction A, the second end 58 of the coil spring 46 is tightly fixed to the housing, however. Thus, the windings of the coil spring 46 are loosened so that the friction between the drive element 34 and, resp., the driven element 40 and the coil spring 46 decreases, thus causing the coupling of the drive element 34 to the driven element 40 to be removed.

The drive element 34 thus may be moved in this position relative to the rocker arm 30. Upon further rotation of the belt reel 14, rotation is effectuated via the gearwheel 62, viz. the drive element 34, while the rocker arm 30 remains stationary.

Co-rotation of the rocker arm 30 is additionally prevented by a stop 70 at the housing cover to which the rocker arm 30 is adjacent in the retracting direction A.

As soon as the belt reel 15 is no longer rotated, the coil spring 46 may return to the home position in which coupling exists between the drive element 34 and the driven element 40.

Upon rotation of the belt reel, the coupling 32 thus acts as a friction coupling, wherein rotation of the drive element 34 relative to the rocker arm 30 is possible from a specific force or at a specific point in time.

With belt tensioning in which the belt reel 14 is rotated at high speed, the coupling 32 may moreover be used as a force limiter.

In FIGS. 8a to 8d, the extending operation of the webbing is shown. The belt reel 14 is rotated against the retracting direction A, wherein, due to the coupling 32 of the rocker arm 30 to the drive element 34, the rocker arm 30 is swiveled against the retracting direction A until it contacts the stop 72.

In said extended position the rocker arm 30 is no longer in contact with the sensor lever 22, hence the latter is released so that vehicle-sensitive blocking may be effectuated.

In said direction of rotation the rocker arm 30 and, resp., the coupling 32 is moved until the first end 54 of the coil spring 46 contacts the stop 68, wherein in the case of further movement of the belt reel 14 against the retracting direction A analogously to the afore-described operation the spring bias is reduced so that the rocker arm 30 can be rotated relative to the drive element 34. The pivot angle of the rocker arm 30 is limited by the stop 72.

The use of a wrap spring coupling for coupling the belt red 14 to the rocker arm 30 offers the advantage over the simpler clamp spring couplings or other friction couplings that, depending on the direction of rotation of the belt reel 14, it is possible to increase or reduce the possible transmissible torque. Upon rotation of the belt reel 14 against the retracting direction A, i.e. upon webbing extension, the coil spring 46 virtually tightens so that a higher torque can be transmitted. Thus, a more reliable movement of the rocker arm 30 from the home position to the extended position takes place so that the sensor lever 22 is reliably released. Upon rotation in the retracting direction A, the transmissible torque which is lower due to the loosening coil spring 46 is positive to the effect that the parts of the belt refractor 10 may rotate against each other more easily so that the load acting on said component parts is reduced.

The use of such coupling 32 is possible independently of the structure of the belt retractor 10 as long as a rocker arm 30 is employed which is adapted to block a sensor lever 22 in a home position and to release the same in an extended position.

Figure 9:
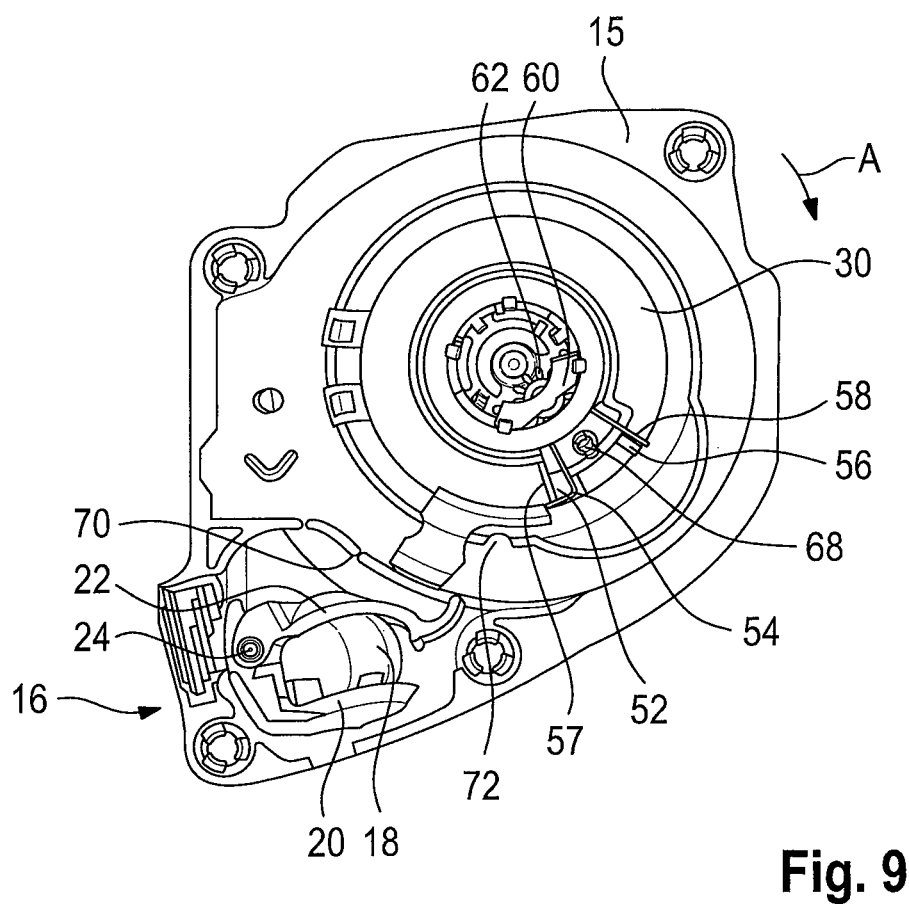
FIG. 9 shows a second embodiment of a housing cap of a belt retractor according to the invention.

A second embodiment of a housing cover 15 for such belt retractor 10 is illustrated in FIG. 9, wherein said embodiment differs from the one shown in FIGS. 1 to 8 merely by the positioning of the sensor 16.

In the illustrated embodiments, the rocker arm 30 as well as the sensor 16 are provided in a housing cover 15. It is also imaginable, however, that they are supported exclusively on the frame 12 of the belt retractor 10.

The invention claimed is:

1. A belt retractor (10) comprising a frame (12), a sensor (16) for vehicle-sensitive blocking including a sensor lever (22), a belt reel (14) and a rocker arm (30) coupled to the belt reel (14) via a coupling (32) which is adjustable between a home position in which the sensor lever (22) is blocked and an extended position in which the sensor lever (22) is released, wherein the coupling (32) is a wrap spring coupling comprising a drive element (34) coupled to the belt reel (14) as well as a driven element (40) connected to the rocker arm (30), wherein the drive element (34) and the driven element (40) have a respective annular outer friction surface (38, 44) and are arranged concentrically to each other, and wherein a coil spring (46) is provided which contacts the friction surfaces (38, 44) and couples the driven element (40) to the drive element (34).

2. The belt retractor according to claim 1, wherein the coil spring (46) is adjacent to the friction surface (44) of the driven element (40) by a first portion (48) and is adjacent to the friction surface (38) of the drive element by a second portion (50), wherein the coil spring (46) extends from the first portion (48) to the second portion (50) in a winding direction corresponding to the retracting direction (A) of the belt retractor.

3. The belt retractor according to claim 1, wherein a first end (54) of the coil spring (46) in the winding direction is held at the rocker arm (30).

4. The belt retractor according to claim 1, wherein a projection (56) to which the second end (58) of the coil spring (46) is adjacent in the winding direction is provided at the rocker arm (30).

5. The belt retractor according to claim 1, wherein a stop (68) for the first end (54) of the coil spring (46) arranged ahead of the first end (54) of the coil spring (46) in the winding direction is provided at the frame (12).

6. The belt retractor according to claim 1, wherein a stop (68) for the second end (58) of the coil spring (46) arranged behind the second end (58) of the coil spring in the winding direction is provided at the frame (12).

7. The belt retractor according to claim 1, wherein stops (70, 72) for the rocker arm (30) delimiting the pivot angle of the rocker arm (30) are provided at the housing (15).

8. The belt retractor according to claim 1, wherein a gearwheel (62) is pivoted on the rocker arm (30), the gearwheel (62) engaging both the drive element (34) and a gearwheel (64) mounted on the belt reel (14), the gearwheel (64) mounted on the belt reel (15) forming a sun gear of a planetary gearing, the drive element (34) forming an internal gear of the planetary gearing, the gearwheel (62) pivoted on the rocker arm (30) forming a planet gear of the planetary gearing.

9. The belt retractor according to claim 1, wherein the rocker arm (30) includes a disk-shaped body (42) and a pot-shaped seat (66) for the body (42) is provided at the housing (15).

10. The belt retractor according to claim 1, wherein the driven element (40) is formed integrally with the rocker arm (30).

* * * * *